(12) United States Patent
Bhattad et al.

(10) Patent No.: US 9,578,520 B2
(45) Date of Patent: Feb. 21, 2017

(54) RECEIVE ANTENNA SELECTION/COMBINING OF RECEIVE ANTENNAS USING FEWER NUMBER OF RECEIVE CHAINS

(71) Applicant: QUALCOMM Incorporated, San Diego, CA (US)

(72) Inventors: Kapil Bhattad, Bangalore (IN); Dhananjay Ashok Gore, Bangalore (IN); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 312 days.

(21) Appl. No.: 13/714,121

(22) Filed: Dec. 13, 2012

(65) Prior Publication Data

US 2013/0155890 A1 Jun. 20, 2013

(30) Foreign Application Priority Data

Dec. 16, 2011 (IN) .......................... 4421/CHE/2011

(51) Int. Cl.
*H04W 24/02* (2009.01)
*H04B 7/08* (2006.01)

(52) U.S. Cl.
CPC ........... *H04W 24/02* (2013.01); *H04B 7/0802* (2013.01); *H04B 7/0874* (2013.01); *H04B 7/0811* (2013.01)

(58) Field of Classification Search
CPC ..................................................... H04W 24/02
USPC ........................................ 370/334; 455/33.3
See application file for complete search history.

(56) References Cited

U.S. PATENT DOCUMENTS

| 7,421,012 B1 | 9/2008 | Feng et al. |
| 7,680,455 B2 | 3/2010 | Moorti et al. |
| 7,917,116 B2 | 3/2011 | Hoo et al. |
| 8,238,975 B2 | 8/2012 | Vallapureddy et al. |
| 8,358,629 B2* | 1/2013 | Grilli ................ H04W 36/0088 370/331 |
| 9,198,069 B2* | 11/2015 | Franklin ................ H04W 24/10 |

(Continued)

FOREIGN PATENT DOCUMENTS

| CN | 101416418 A | 4/2009 |
| JP | 2004297795 A | 10/2004 |

(Continued)

OTHER PUBLICATIONS

International Search Report and Written Opinion—PCT/US2012/069635—ISA/EPO—Mar. 13, 2013.

(Continued)

*Primary Examiner* — Hassan Kizou
*Assistant Examiner* — Deepa Belur
(74) *Attorney, Agent, or Firm* — Patterson & Sheridan, L.L.P.

(57) ABSTRACT

Methods and apparatus for performing receive antenna diversity measurements in measurement gaps are provided. One embodiment may include communicating with a serving base station using a first set of one or more receive antennas during a normal operational period, performing receive antenna diversity measurements with a second set of one or more receive antennas during a measurement gap between normal operational periods, and selecting one or more receive antennas for at least one of use and/or combining, based on the receive antenna diversity measurements.

48 Claims, 7 Drawing Sheets

(56) References Cited

U.S. PATENT DOCUMENTS

| | | | |
|---|---|---|---|
| 9,294,972 B2* | 3/2016 | Radulescu | H04W 36/0083 |
| 2002/0164968 A1 | 11/2002 | Crawford | |
| 2004/0179491 A1 | 9/2004 | Hosomi | |
| 2007/0232309 A1* | 10/2007 | Koszarsky | 455/436 |
| 2008/0095132 A1* | 4/2008 | Lindoff et al. | 370/342 |
| 2008/0211969 A1* | 9/2008 | Simon et al. | 348/725 |
| 2009/0191862 A1* | 7/2009 | Amirijoo et al. | 455/424 |
| 2010/0113055 A1* | 5/2010 | Iwamura et al. | 455/452.1 |
| 2010/0322328 A1* | 12/2010 | Schirmacher | H04B 7/0404 375/260 |
| 2010/0323627 A1 | 12/2010 | Alanara | |
| 2012/0064873 A1* | 3/2012 | Farnsworth | H04W 24/10 455/418 |
| 2012/0135696 A1* | 5/2012 | Lerzer | H04W 52/0296 455/127.1 |
| 2012/0142295 A1 | 6/2012 | Tseng et al. | |
| 2012/0178465 A1* | 7/2012 | Lin | H04W 24/10 455/450 |
| 2012/0250612 A1* | 10/2012 | Jalloul et al. | 370/328 |
| 2013/0235755 A1* | 9/2013 | Lucky | H04W 24/04 370/252 |
| 2014/0004802 A1* | 1/2014 | Ljung | H04B 7/0811 455/73 |
| 2014/0341313 A1* | 11/2014 | Kim et al. | 375/267 |

FOREIGN PATENT DOCUMENTS

| | | | |
|---|---|---|---|
| JP | 2009532936 A | 9/2009 | |
| NL | WO 2005064971 A1 * | 7/2005 | H04B 7/2637 |
| WO | 2007114840 A1 | 10/2007 | |

OTHER PUBLICATIONS

Samsung: "UE capability signaling structure w.r.t carrier aggregation, MIMO and measurement gap," 3GPP Draft; R2-110874 CA MIMO Capability, 3rd Generation Partnership Ptoject (3GPP), Mobile Competence Centre ; 650, Route Des Lucioles ; F-06921 Sophia-Antipolis Cedex; France, vol. RAN WG1, no. Taipei, Taiwan; Feb. 21, 2011, Feb. 15, 2011 (Feb. 15, 2011), XP050493635, [Retrieved on Feb. 15, 2011].

* cited by examiner

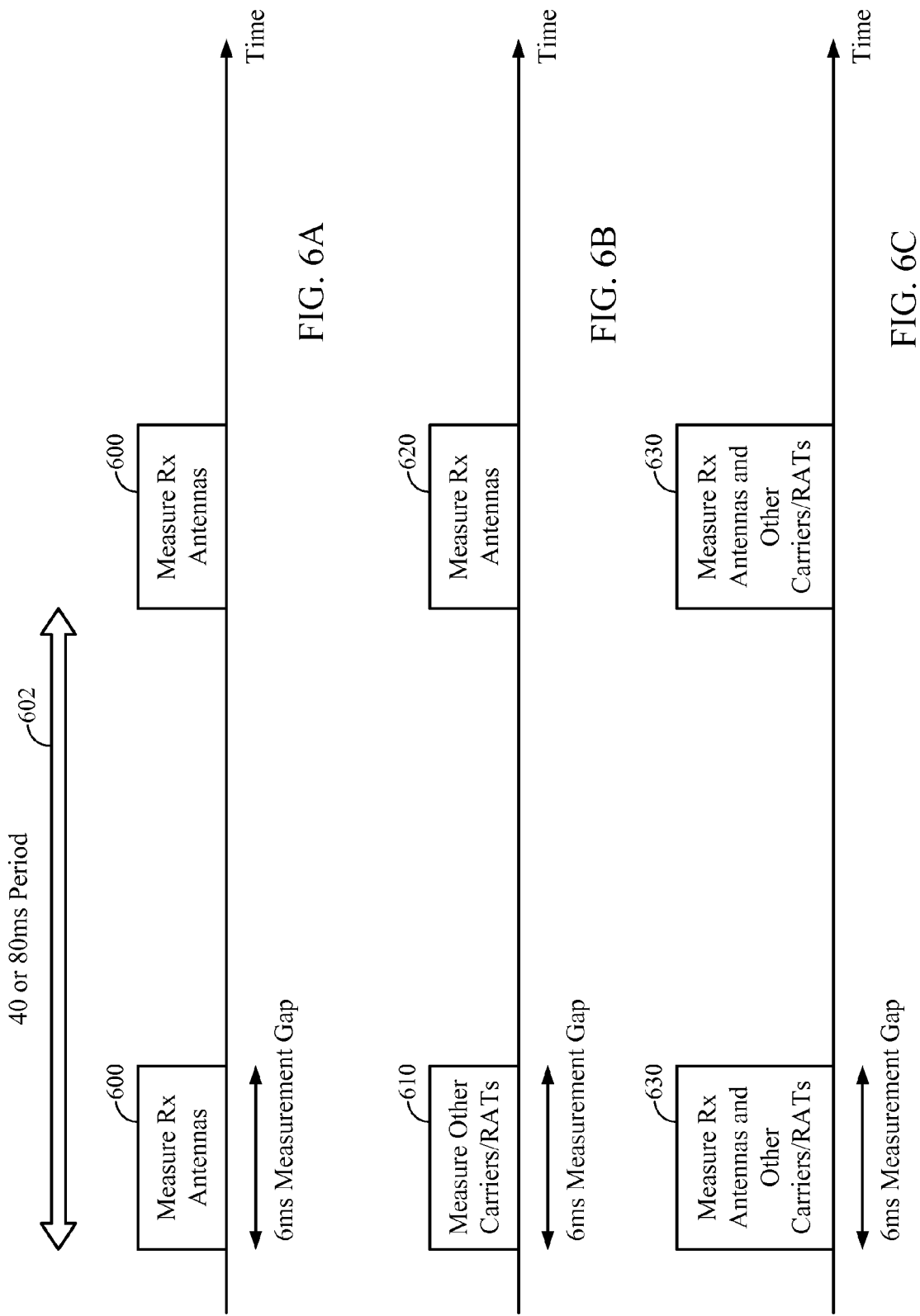

RECEIVE ANTENNA SELECTION/COMBINING OF RECEIVE ANTENNAS USING FEWER NUMBER OF RECEIVE CHAINS

CLAIM OF PRIORITY UNDER 35 U.S.C. §119

This application claims benefit of India Provisional Patent Application No. 4421/CHE/2011, filed Dec. 16, 2011, which is herein incorporated by reference in its entirety.

BACKGROUND

Field

Certain aspects of the present disclosure generally relate to wireless communications and, more specifically, to performing receive antenna diversity measurements in measurement gaps.

Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station. A base station may transmit data and control information on the downlink to a UE and/or may receive data and control information on the uplink from the UE.

Multiple receive (Rx) antennas may improve UE performance due to a number of reasons, such as increasing the amount of received energy and, hence, improving signal to noise ratio (SNR) and by providing diversity gains and allowing the UE to receive more parallel streams. However, to achieve full benefit from multiple receive antennas, it may be necessary to have a full receive chain for each antenna which may be cost prohibitive.

Therefore, techniques for utilizing multiple Rx antennas while having a fewer number of receive chains is desirable.

SUMMARY

Certain aspects of the present disclosure provide a method for wireless communications. The method generally includes communicating with a base station using a first set of one or more receive antennas during a normal operational period, performing receive antenna diversity measurements with a second set of one or more receive antennas during a measurement gap between normal operational periods, and selecting one or more receive antennas for at least one of use and/or combining, based on the receive antenna diversity measurements.

Certain aspects of the present disclosure provide a method for wireless communications. The method generally includes communicating with a user equipment (UE) that utilizes a first set of one or more receive antennas during a normal operational period and configuring the UE with measurement gaps for performing receive antenna diversity measurements with a second set of one or more receive antennas.

Certain aspects of the present disclosure provide an apparatus for wireless communications. The apparatus generally includes means for communicating with a serving base station using a first set of one or more receive antennas during a normal operational period, means for performing receive antenna diversity measurements with a second set of one or more receive antennas during a measurement gap between normal operational periods, and means for selecting one or more receive antennas for at least one of use and/or combining, based on the receive antenna diversity measurements.

Certain aspects of the present disclosure provide an apparatus for wireless communications. The apparatus generally includes means for communicating with a user equipment (UE) that utilizes a first set of one or more receive antennas during a normal operational period and means for configuring the UE with measurement gaps for performing receive antenna diversity measurements with a second set of one or more receive antennas.

Certain aspects of the present disclosure provide a computer-program product for wireless communications by a first device, comprising a computer-readable medium having instructions stored thereon, the instructions being executable by one or more processors. The instructions generally include instructions for communicating with a serving base station using a first set of one or more receive antennas during a normal operational period, instructions for performing receive antenna diversity measurements with a second set of one or more receive antennas during a measurement gap between normal operational periods, and instructions for selecting one or more receive antennas for at least one of use and/or combining, based on the receive antenna diversity measurements.

Certain aspects of the present disclosure provide a computer-program product for wireless communications by a first device, comprising a computer-readable medium having instructions stored thereon, the instructions being executable by one or more processors. The instructions generally include instructions for communicating with a user equipment (UE) that utilizes a first set of one or more receive antennas during a normal operational period and instructions for configuring the UE with measurement gaps for performing receive antenna diversity measurements with a second set of one or more receive antennas.

Certain aspects of the present disclosure provide an apparatus for wireless communications, comprising at least one processor. The processor is generally configured to communicate with a serving base station using a first set of one or more receive antennas during a normal operational period, perform receive antenna diversity measurements with a second set of one or more receive antennas during a measurement gap between normal operational periods, and select one or more receive antennas for at least one of use and/or combining, based on the receive antenna diversity measurements.

Certain aspects of the present disclosure provide an apparatus for wireless communications, comprising at least one processor. The processor is generally configured to communicate with a user equipment (UE) that utilizes a first set of one or more receive antennas during a normal operational period and configure the UE with measurement gaps for performing receive antenna diversity measurements with a second set of one or more receive antennas.

Various aspects and features of the disclosure are described in further detail below.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 6A-6C illustrate example receive antenna diversity measurements performed during measurement gaps, in accordance with aspects of the present disclosure.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (WiFi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Example Wireless Network

Figure 1:
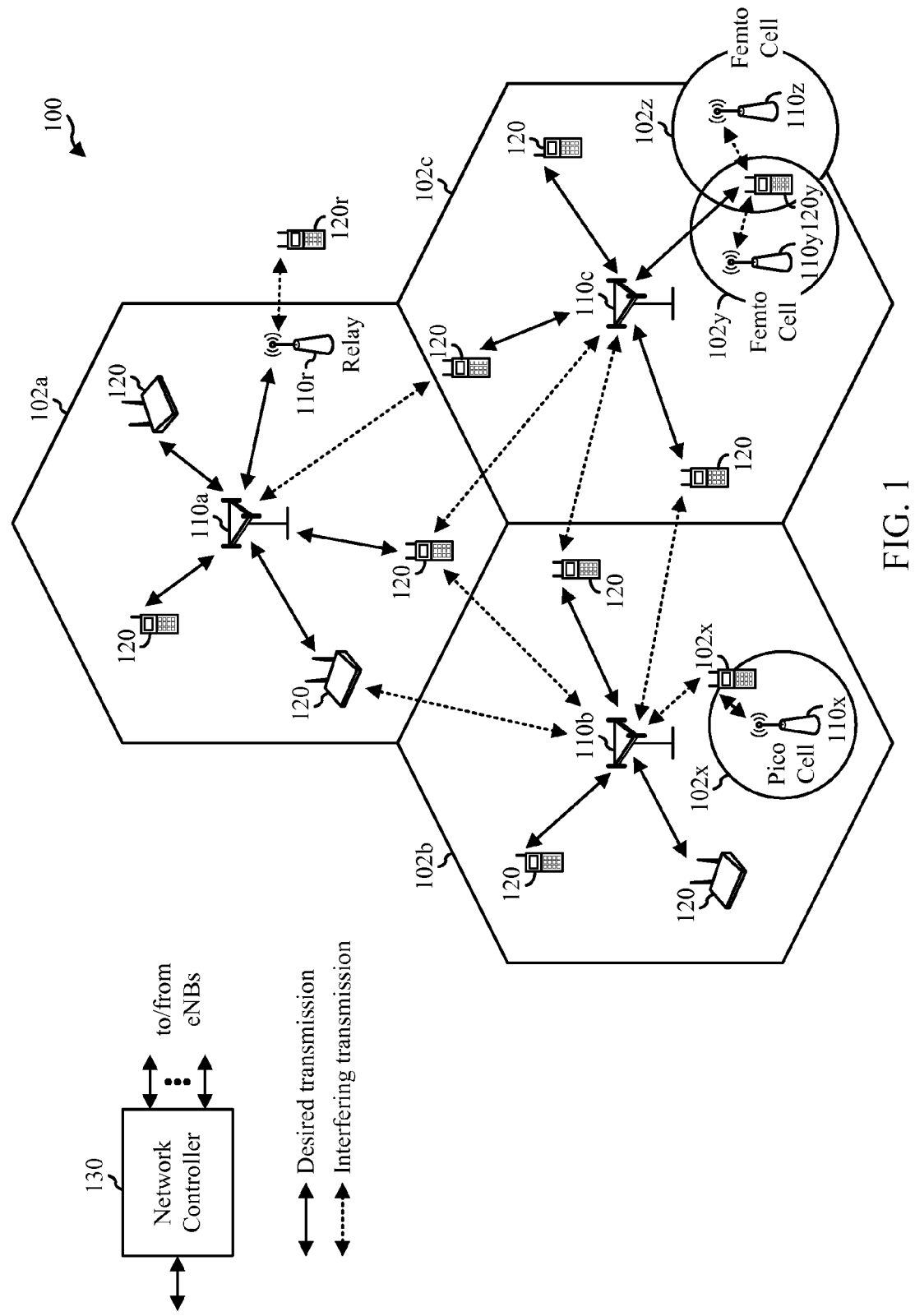
FIG. 1 is a block diagram conceptually illustrating an example of a wireless communications network, in accordance with certain aspects of the present disclosure.

FIG. 1 shows a wireless communication network 100, which may be an LTE network. The wireless network 100 may include a number of evolved Node Bs (eNBs) 110 and other network entities. An eNB may be a station that communicates with user equipment devices (UEs) and may also be referred to as a base station, a Node B, an access point, etc. Each eNB 110 may provide communication coverage for a particular geographic area. The term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 1, eNBs 110a, 110b, and 110c may be macro eNBs for macro cells 102a, 102b, and 102c, respectively. eNB 110x may be a pico eNB for a pico cell 102x. eNBs 110y and 110z may be femto eNBs for femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with eNB 110a and a UE 120r in order to facilitate communication between eNB 110a and UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 watts) whereas pico eNBs, femto eNBs, and relays may have a lower transmit power level (e.g., 1 watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz, and there may be 1, 2, 4, 8, or 16 subbands for system bandwidth of 1.25, 2.5, 5, 10, or 20 MHz, respectively.

Figure 2:
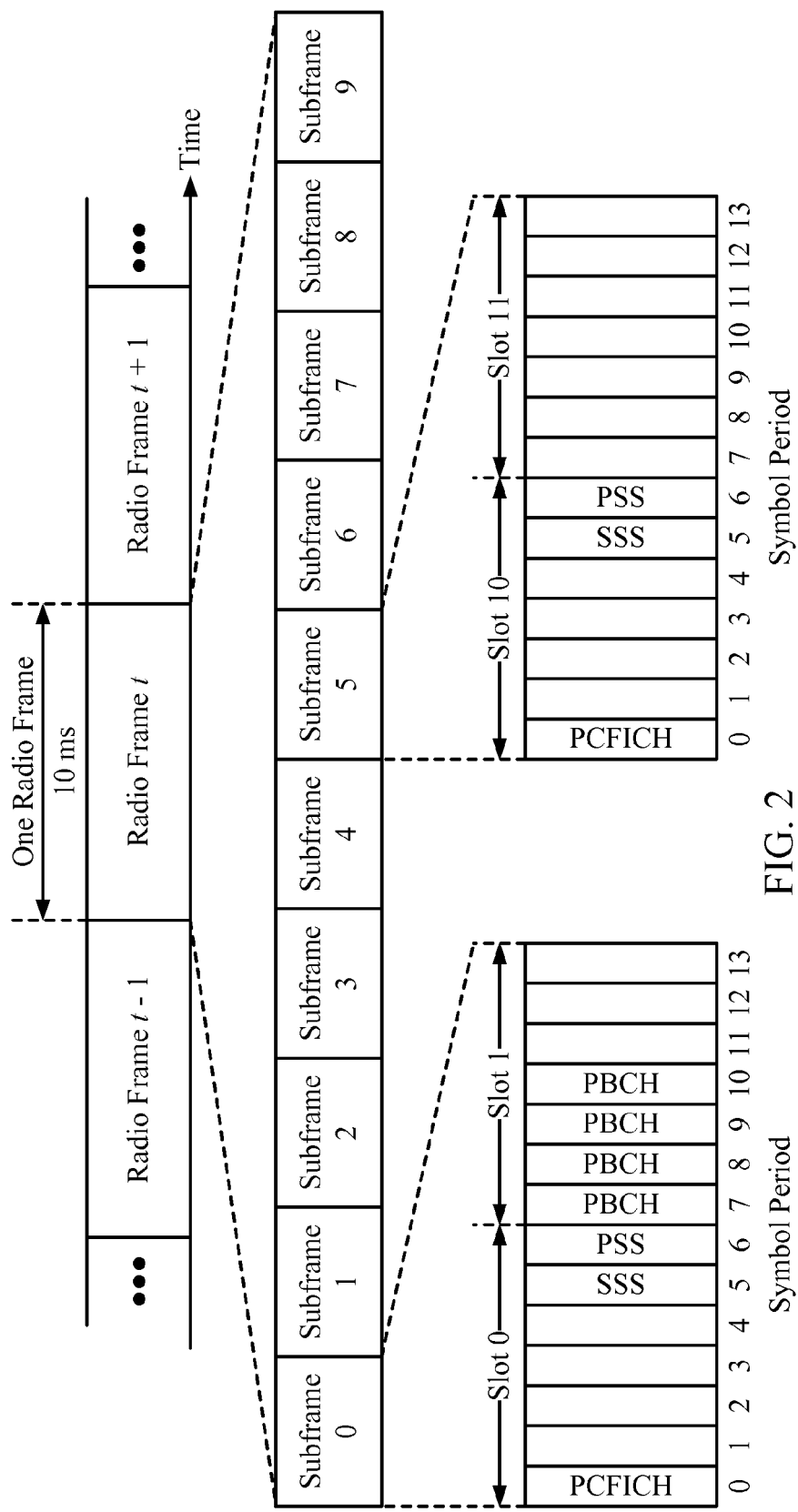
FIG. 2 is a block diagram conceptually illustrating an example of a frame structure in a wireless communications network, in accordance with certain aspects of the present disclosure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP), as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks.

The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 2A:
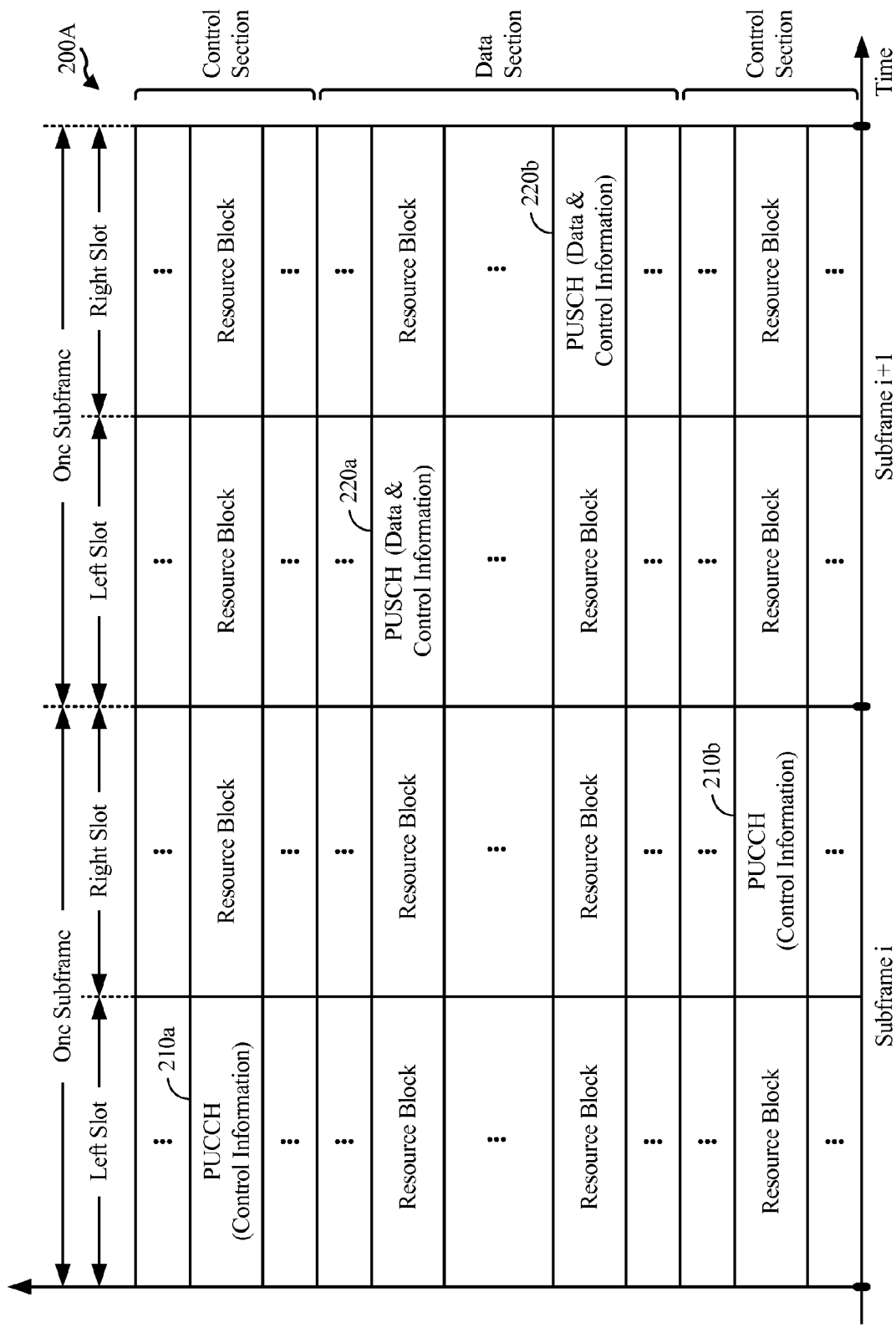
FIG. 2A shows an example format for the uplink in Long Term Evolution (LTE), in accordance with certain aspects of the present disclosure.

FIG. 2A shows an exemplary format 200A for the uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2A results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the Node B. The UE may transmit control information in a Physical Uplink Control Channel (PUCCH) 210a, 210b on the assigned resource blocks in the control section. The UE may transmit data or both data and control information in a Physical Uplink Shared Channel (PUSCH)

220a, 220b on the assigned resource blocks in the data section. An uplink transmission may span both slots of a subframe and may hop across frequency as shown in FIG. 2A.

A UE may be within the coverage of multiple eNBs. One of these eNBs may be selected to serve the UE. The serving eNB may be selected based on various criteria such as received power, path loss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE 120y may be close to femto eNB 110y and may have high received power for eNB 110y. However, UE 120y may not be able to access femto eNB 110y due to restricted association and may then connect to macro eNB 110c with lower received power (as shown in FIG. 1) or to femto eNB 110z also with lower received power (not shown in FIG. 1). UE 120y may then observe high interference from femto eNB 110y on the downlink and may also cause high interference to eNB 110y on the uplink.

A dominant interference scenario may also occur due to range extension, which is a scenario in which a UE connects to an eNB with lower path loss and lower SNR among all eNBs detected by the UE. For example, in FIG. 1, UE 120x may detect macro eNB 110b and pico eNB 110x and may have lower received power for eNB 110x than eNB 110b. Nevertheless, it may be desirable for UE 120x to connect to pico eNB 110x if the path loss for eNB 110x is lower than the path loss for macro eNB 110b. This may result in less interference to the wireless network for a given data rate for UE 120x.

In an aspect, communication in a dominant interference scenario may be supported by having different eNBs operate on different frequency bands. A frequency band is a range of frequencies that may be used for communication and may be given by (i) a center frequency and a bandwidth or (ii) a lower frequency and an upper frequency. A frequency band may also be referred to as a band, a frequency channel, etc. The frequency bands for different eNBs may be selected such that a UE can communicate with a weaker eNB in a dominant interference scenario while allowing a strong eNB to communicate with its UEs. An eNB may be classified as a "weak" eNB or a "strong" eNB based on the relative received power of signals from the eNB received at a UE (and not based on the transmit power level of the eNB).

Figure 3:
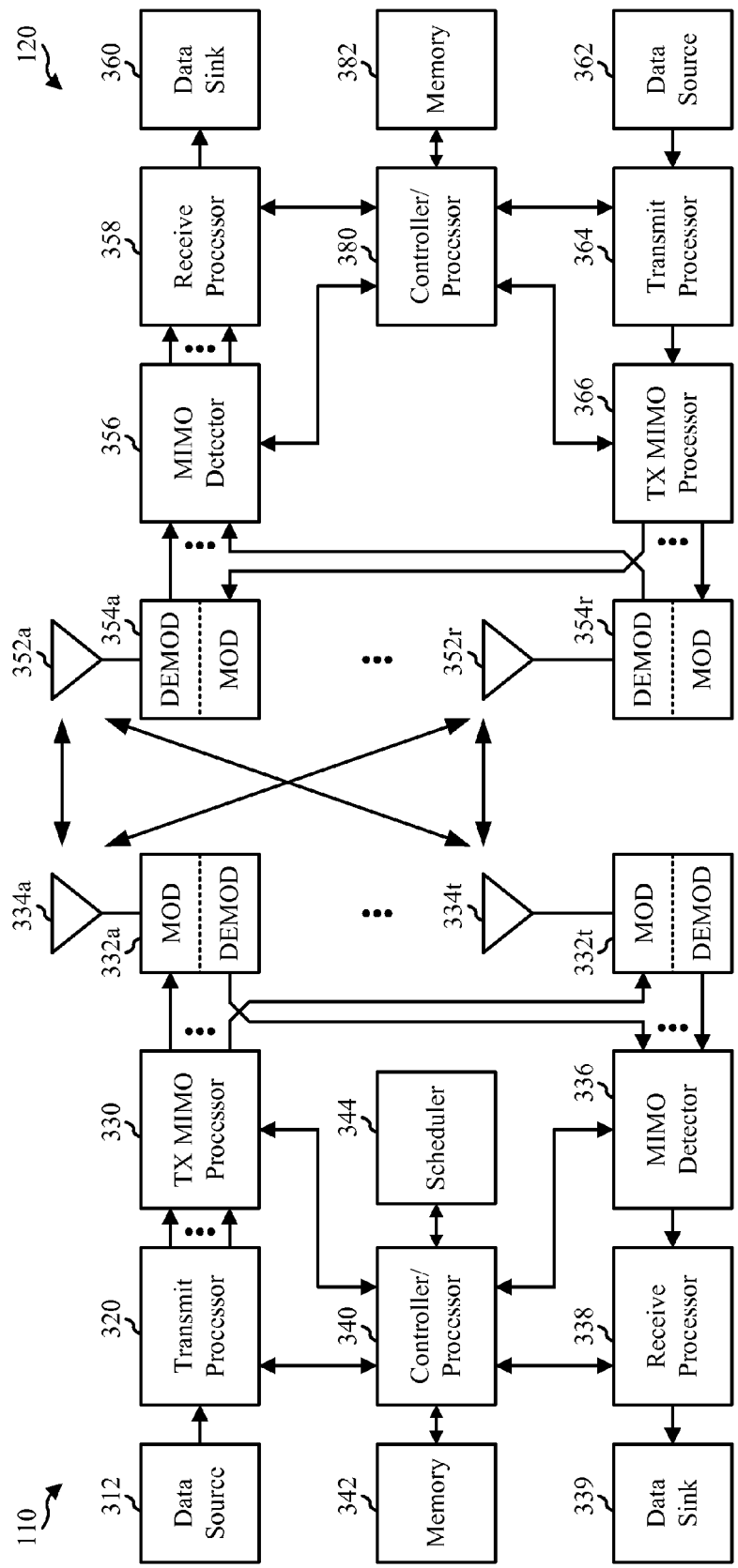
FIG. 3 shows a block diagram conceptually illustrating an example of a Node B in communication with a user equipment device (UE) in a wireless communications network, in accordance with certain aspects of the present disclosure.

FIG. 3 shows a block diagram of a design of a base station or an eNB 110 and a UE 120, which may be one of the base stations/eNBs and one of the UEs in FIG. 1. For a restricted association scenario, the eNB 110 may be macro eNB 110c in FIG. 1, and UE 120 may be UE 120y. The eNB 110 may also be a base station of some other type. The eNB 110 may be equipped with T antennas 334a through 334t, and the UE 120 may be equipped with R antennas 352a through 352r, where in general T 1 and R≥1.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively.

At the UE 120, antennas 352a through 352r may receive the downlink signals from the eNB 110 and may provide received signals to demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all R demodulators 354a through 354r, perform MIMO detection on the received symbols, if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from the transmit processor 364 may be precoded by a TX MIMO processor 366 if applicable, further processed by modulators 354a through 354r (e.g., for SC-FDM, etc.), and transmitted to the eNB 110. At the eNB 110, the uplink signals from the UE 120 may be received by antennas 334, processed by demodulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340, 380 may direct the operation at the eNB 110 and the UE 120, respectively. The controller/processor 380 and/or other processors and modules at the UE 120 may perform or direct operations 400 in FIG. 4 and/or other processes for the techniques described herein. The memory 382 may store data and program codes for UE 120. A scheduler 344 may schedule UEs for data transmission on the downlink and/or uplink.

Receive Antenna Selection/Combining of Receive Antennas Using Fewer Number of Receive Chains In many cases, multiple receive (Rx) antennas may improve a User Equipment (UE) performance. As noted above, multiple Rx antennas may increase the amount of the received energy and, thus, improve SNR. Multiple Rx antennas may provide diversity gains in fading environments. Multiple Rx antennas may mitigate impact of semi-static imbalance, for example, when a user holds a phone (an example of a UE) in a manner that blocks some antennas more than others. Multiple Rx antennas may also be used to provide MIMO gains, allowing more parallel streams to be delivered to the UE.

However, full support for multiple Rx antennas may entail adding Radio Frequency (RF) chains for each Rx antenna and adding baseband processing capability to support all the Rx antennas. Baseband processing capability may include, for example, the ability to take channel measurements (for example, to obtain channel estimate) on all antennas simultaneously and process signals from all antennas simultaneously. Unfortunately, due to cost restrictions, conventional modem chipsets baseband processing (e.g., for LTE) support only 2 Rx antennas.

Certain aspects of the present disclosure provide techniques to obtain diversity gains from multiple Rx antennas (such as selection diversity) using a baseband modem that may support full baseband processing for fewer than all of the available Rx antennas. While examples below describe baseband modem processing for two Rx antennas, those skilled in the art will appreciate that the techniques described herein may be applied in any configuration that has a greater number of Rx antennas than receive chains with full baseband processing support.

Certain devices may be particularly suited to benefit from techniques presented herein. For example, mobile Hotspots sometimes referred to as "MiFi" device, with LTE backhaul and WiFi access, may benefit from the above example techniques. As will be understood, the provided techniques are not limited to MiFi devices and the above techniques may be implemented in other devices as well. However, Mifi devices may benefit, as they may support the operator's carrier frequency and may not be required to handoff to other technologies on the backhaul. Hence, conventional measurement gaps may not be required to measure other technology/carriers. In addition, the channel may be likely to vary slowly, allowing the device to obtain diversity gains, even with relatively infrequent measurements.

One technique to obtain diversity gain that may not require channel estimates across the Rx antennas is cyclic delay diversity. In some embodiments, this technique may involve delaying the signals from two or more Rx antennas, with respect to each other, and adding the delayed signals together to create a stronger virtual receive antenna(s).

However, other diversity techniques may be used, for example, in some techniques providing relatively large gains that require channel estimation of the Rx antennas. In some embodiments, selection diversity may be used to select the two antennas with the best receive channel quality. According to some example embodiments, selection diversity (and determining the best channel quality) may be obtained using inter-frequency measurement gaps provided in LTE.

Generally, a UE may perform two types of search and measurements: intra-frequency measurements and inter-frequency measurements. In general, a search may involve determining the cell ID, timing of nearby base stations by locating one or more of primary synchronization signal (PSS)/secondary synchronization signal (SSS) or reference signals transmitted by the base stations. Measurements may involve estimating quantities such as RSRP and RSSI using reference signals (CRS/CSI-RS) transmitted by the base station.

Intra-frequency search and measurements are performed on the same carrier frequency on which the UE is operating (e.g., the serving cell carrier frequency). With intra-frequency measurements the UE measures its serving cell and searches for and measures neighboring cells, in order to monitor whether a neighboring cell becomes stronger than the serving cell.

Inter-frequency searches and measurements are performed by the UE on other carrier frequencies than the carrier frequency on which the UE is operating. In some embodiments the carrier frequency may belong to the same radio access technology (RAT). In some embodiments, the UE may perform searches and measurements on carrier frequencies belonging to other RATs (referred to as inter-RAT measurements).

To enable inter-frequency searches and measurements, UEs are configured with measurement gaps. Measurement gaps are periods during which the UE may not have to process control and data transmission in its serving cell—allowing it to scan other frequencies without missing transmissions from the base station. For example, a UE may be configured with a measurement gap every 40 ms wherein a 6 ms search may be performed. In another example, the UE may be configured with a 6 ms measurement gap every 80 ms.

In some embodiments, a UE may estimate and process received transmissions at two Rx antennas (assuming two receive chains) in the normal processing period. During measurement gaps, the UE may perform inter-frequency measurements on the two Rx antennas and—additionally or alternatively—the UE may measure different Rx antennas on the same carrier frequency (serving cell carrier frequency). The UE may then use these measurements made during the inter-frequency measurement gaps to perform diversity processing, for example, to determine which Rx antennas to use (selection) or how to combine the antennas until the next time the UE can make the measurement.

As noted above, inter-frequency measurement gaps are conventionally used for performing search and measurement of other cells. In some embodiments, this may comprise one or more of determining Automatic Gain Control (AGC) operating points, performing searches for neighboring cells to identify cells, performing measurements of identified cells, and performing other types of measurements.

Since some Rx antennas may be better than other Rx antennas, the techniques presented herein may provide diversity that is beneficial when searching for neighboring cells and performing measurements.

According to certain aspects, some of the conventional steps for performing the intra-frequency or inter-frequency search may be omitted. For example, a new inter-frequency search may not be performed for antennas on the same carrier, since the operation is performed during intra-frequency search and search results (timing, cell id etc) from the intra-frequency search are available. According to certain aspects, measurements of other Rx antennas may be used only for serving cell measurements for which necessary information has already been obtained.

According to certain aspects, to enable Rx diversity measurements, a base station (eNB) may schedule measurement gaps in scenarios in which a gap would not conventionally be scheduled. For example, an LTE eNB may schedule measurement gaps even if an LTE channel is very good and even if a UE may not—or is not required to—support other carrier frequencies and/or other RATs.

According to certain aspects, a UE may have a (signaling) mechanism for the UE to request measurement gaps from the eNB, for example, with some type of request message. Additionally or alternatively, signaling capability (UE capability bits) may be added that indicate to a eNB which UEs need measurement gaps for Rx antenna diversity measurements.

The eNB may modify its processing of Channel Quality Indicator (CQI) report receptions, rate control loops, and UL power control knowing that the UE may change its Rx antennas and possibly transmit (Tx) antennas (if the same Rx antenna is used for both transmitting and receiving). For example it may reduce the amount of CQI filtering used rate prediction when it knows that the antennas may change at UE. According to certain aspects, the UE may cycle sounding (send SRS) over more than 2 Rx antennas to aid the eNB with these processes.

In other scenarios, measurement gaps may be required for other technologies. For example, Rx diversity measurements may be limited where a measurement gap is needed for other purposes. In some cases, support for measuring additional antennas on the same carrier (serving cell carrier frequency) may be disabled.

In some embodiments, some measurement gaps may be used for Rx diversity measurements (e.g., to measure current carriers signal on the other Rx antennas), while other measurement gaps may be used to measure the other carriers/technologies. In some aspects, the UE has fewer measurement gaps for other carriers/technologies and the requirements for measurements for those carriers/technologies may be relaxed. In one embodiment, for example, measurement gaps may be scheduled every 40 ms and may alternate between intra-frequency measurements on serving cell carrier frequency using other antennas and inter-frequency measurements. In this case, the UE may be configured to meet the requirements with respect to 80 ms measurement gap period—allowing the UE to meet the requirements despite performing inter-frequency (or inter-RAT) measurements every other measurement gap.

In some embodiments, the UE may use a different set of antennas in different measurement gaps to get diversity in measurements and searches. The UE may perform measurements in this manner for all carriers and not just the serving cell carrier. For example we may be employing a search procedure multiple times using different set of received samples on a particular carrier to improve chances of detection. Since different samples are used we get time diversity with such an approach. When we have 4 Rx antennas and 2 Rx chains we could perform search using 2 Rx antennas on one occasion and using the other 2 receive antennas on a second occasion instead of using the same 2 Rx antennas on both occasions. Such a scheme provides the benefit of receive diversity in addition to the time diversity.

If UE is in a Discontinuous Reception (DRX) mode or idle mode, the UE may not monitor several control or data subframes. The UE may choose to monitor a portion of the subframes for measurements and search. The UE may switch between the different antennas for searches and measurements outside of the measurement gaps. As a result, measurement gaps may not be needed.

In summary, the above noted example embodiments may utilize measurement gaps to perform measurements for other Rx antennas of the serving cell carrier frequency. In some embodiments, some of the steps normally associated with inter-frequency search may be skipped when measuring serving cell carrier frequency. The measurement gap may be used for measurements when operating in connected mode, but connected DRX or RRC IDLE mode may not be required to rely on measurement gaps. In a connected mode, measurement gaps may be scheduled, although such scheduling may normally not be required.

In some embodiments, the techniques above may use a subset of measurement gaps for the serving cell carrier frequency on other antennas and some or all of the remaining measurement gaps for other carriers/technologies. The above techniques may switch between Rx antennas in measurement gaps to obtain receive diversity for searches and measurements. The techniques also utilize new signals and/or signaling capabilities from the UE to the eNB to request measurement gap or signal the need for measurement gaps to perform Rx antenna diversity measurements.

According to certain aspects, different antennas are selected for "normal" use and, thus, the antennas used to measure Rx antenna diversity during measurement gaps will change over time (i.e., different set of antennas are used for different measurement gaps depending on the antennas selected for normal use).

In some embodiments, a search may be skipped or limited to windows around a subset of cells found during intra-frequency search when measuring serving cell carrier frequency using other Rx antennas in the measurement gaps. As used herein, the term "windows" generally refers to a set of timing hypotheses around the detected timing of previously detected cells.

Further optimizations may also be made, for example, to improve performance. In some embodiments, a UE may continue to be served control/data on at least a subset of the subframes in the measurement gap that it is using to measure the serving cell carrier frequency using other Rx antennas.

Figure 4:
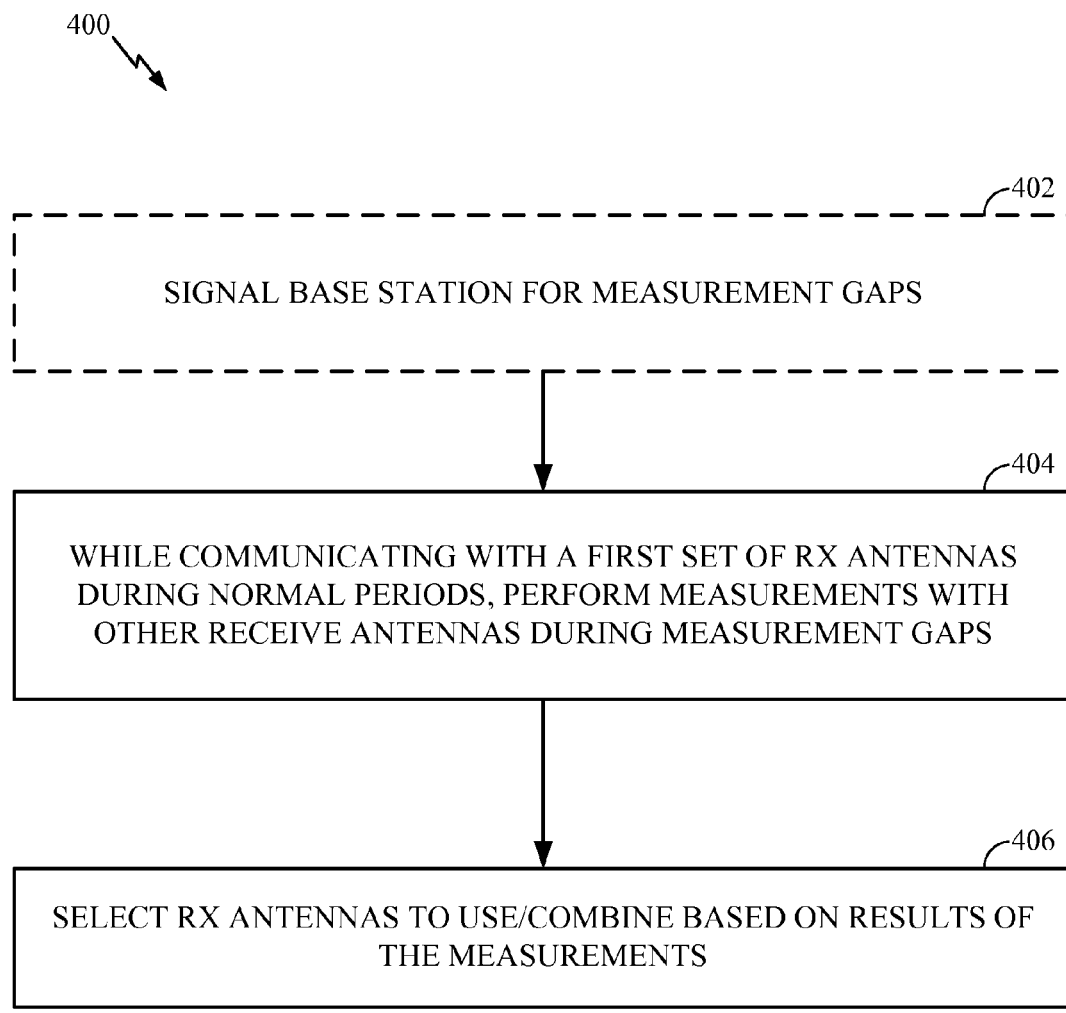
FIG. 4 illustrates example operations for receive antenna diversity that may be performed, for example, by a user equipment (UE), in accordance with certain aspects of the present disclosure.

FIG. 4 is a flow diagram of example operations 400 for performing Rx antenna diversity measurements during measurement gaps. The operations may be performed, for example, by a user equipment (UE).

According to certain aspects, the UE may first signal a base station for measurement gaps, at 402. As noted above, the UE may explicitly request measurement gaps or may signal the capability to perform Rx antenna diversity measurements during measurement gaps. At 404, while communicating with a first set of one or more Rx antennas during normal periods, the UE may perform measurements with other antennas during measurement gaps. At 406, the UE may use the results of the measurements to select antennas for use and/or for combining.

Figure 5:
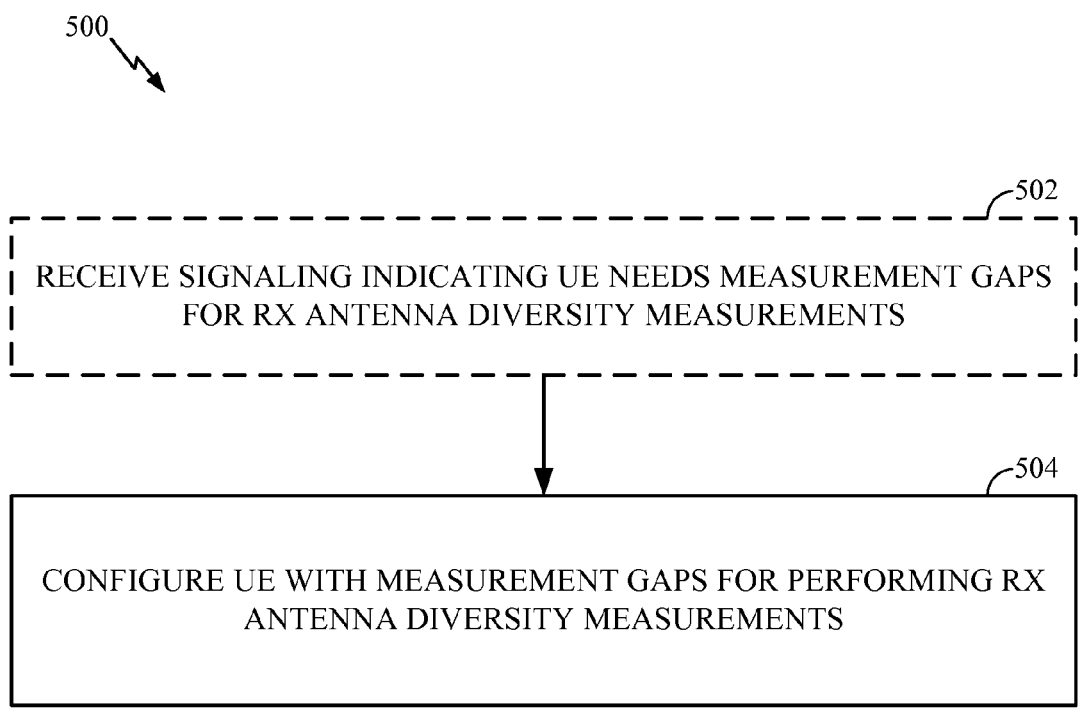
FIG. 5 illustrates example operations for enabling receive antenna diversity that may be performed, for example, by a base station, in accordance with certain aspects of the present disclosure.

FIG. 5 is a flow diagram of example operations 500 for enabling Rx antenna diversity measurements by a UE during measurement gaps. The operations may be performed, for example, by a base station (e.g., an eNB).

In some embodiments, the base station may receive signaling indicating the need by a UE to be configured with measurement gaps for performing Rx diversity measurements, at 502. As noted above, the UE may explicitly request measurement gaps or may signal the capability to perform Rx antenna diversity measurements during measurement gaps. At 504, the base station configures the UE for measurement gaps for performing Rx diversity measurements. As noted above, the base station may configure the UE with measurement gaps even when it would otherwise not do so (e.g., given a strong channel in the serving cell).

FIG. 6A illustrates how a UE may take Rx antenna diversity measurement during measurement gaps 600 between normal operational periods of a, for example, 40 or 80 ms period 602. As illustrated in FIG. 6B, in some cases a UE may alternate between taking (conventional) inter-frequency or inter-RAT measurements in some measurement gaps 610 and Rx antenna diversity measurements in other measurement gaps 620. As illustrated in FIG. 6C, in some cases, a UE may take both Rx antenna diversity measurements and inter-frequency/inter-RAT measurements in some measurement gaps 630.

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, means for receiving may comprise a receiver, a demodulator 354, and/or an antenna 352 of the UE 120 depicted in FIG. 3. Means for processing, means for determining, means for sampling, and/or means for correlating may comprise a processing system, which may include at least one processor, such as the receive processor 358, the transmit processor 364, and/or the controller/processor 380 of the UE 120 illustrated in FIG. 3.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications, comprising:
    communicating with a serving base station on a serving cell carrier frequency using a first set of one or more receive antennas during a normal operational period;
    performing receive antenna diversity measurements on the serving cell carrier frequency with a second set of one or more receive antennas during measurement gaps between normal operational periods, wherein the second set of one more receive antennas does not include receive antennas in the first set of one or more receive antennas, and wherein performing receive antenna diversity measurements comprises switching between taking measurements for the serving cell carrier frequency from the second set of antennas in one measurement gap and taking measurements for at least one of other carriers or other radio access technologies in a different measurement gap; and
    selecting one or more receive antennas for use, combining, or a combination thereof, based on the receive antenna diversity measurements.

2. The method of claim 1, wherein the second set of antennas changes over time.

3. The method of claim 1, wherein performing the receive antenna diversity measurements further comprises: choosing an automated gain control (AGC) operating point, performing a neighbor search to identify cells, or a combination thereof.

4. The method of claim 3, wherein the neighbor search is at least one of skipped or limited to windows around a subset of cells found during intra-frequency search when measuring serving cell carrier frequency using other receive antennas in the measurement gaps.

5. The method of claim 1, further comprising receiving control information, data, or a combination thereof from the serving base station on at least a subset of subframes in the measurement gaps.

6. The method of claim 1, further comprising signaling the serving base station to establish the measurement gaps.

7. The method of claim 6, wherein the signaling comprises requesting measurement gaps.

8. The method of claim 6, wherein the signaling comprises signaling a capability to perform receive antenna diversity measurements during measurement gaps.

9. The method of claim 1, wherein performing receive antenna diversity measurements further comprises:
using samples from different sets of antennas in different measurement gaps while taking measurements for at least one of other carriers or other radio access technologies.

10. The method of claim 1, further comprising:
transmitting sounding reference signals (SRS) from more than 2 receive antennas.

11. A method for wireless communications, comprising:
communicating on a serving cell carrier frequency with a user equipment (UE) that utilizes a first set of one or more receive antennas during a normal operational period;
receiving signaling from the UE to establish measurement gaps, wherein the signaling comprises signaling a capability to perform receive antenna diversity measurements during measurement gaps; and
configuring the UE with the measurement gaps for performing receive antenna diversity measurements on the serving cell carrier frequency with a second set of one or more receive antennas, wherein the second set of one more receive antennas does not include receive antennas in the first set of one or more receive antennas.

12. The method of claim 11, further comprising:
adjusting scheduling, based on the configured measurement gaps, of at least one of CQI report receptions, their use in rate control loops, or UL power control.

13. An apparatus for wireless communications, comprising:
means for communicating with a serving base station on a serving cell carrier frequency using a first set of one or more receive antennas during a normal operational period;
means for performing receive antenna diversity measurements on the serving cell carrier frequency with a second set of one or more receive antennas during measurement gaps between normal operational periods, wherein the second set of one more receive antennas does not include receive antennas in the first set of one or more receive antennas, and wherein means for performing receive antenna diversity measurements comprises means for switching between taking measurements for the serving cell carrier frequency from the second set of antennas in one measurement gap and taking measurements for at least one of other carriers or other radio access technologies in a different measurement gap; and
means for selecting one or more receive antennas for use, combining, or a combination thereof, based on the receive antenna diversity measurements.

14. The apparatus of claim 13, wherein the second set of antennas changes over time.

15. The apparatus of claim 13, wherein performing the receive antenna diversity measurements further comprises: choosing an automated gain control (AGC) operating point, performing a neighbor search to identify cells, or a combination thereof.

16. The apparatus of claim 15, wherein the neighbor search is at least one of skipped or limited to windows around a subset of cells found during intra-frequency search when measuring serving cell carrier frequency using other receive antennas in the measurement gaps.

17. The apparatus of claim 13, further comprising:
means for receiving control information, data, or a combination thereof from the serving base station on at least a subset of subframes in the measurement gaps.

18. The apparatus of claim 13, further comprising:
means for signaling the serving base station to establish the measurement gaps.

19. The apparatus of claim 18, wherein the signaling comprises requesting measurement gaps.

20. The apparatus of claim 18, wherein the signaling comprises signaling a capability to perform receive antenna diversity measurements during measurement gaps.

21. The apparatus of claim 13, wherein performing receive antenna diversity measurements further comprises:
using samples from different sets of antennas in different measurement gaps while taking measurements for at least one of other carriers or other radio access technologies.

22. The apparatus of claim 13, further comprising:
means for transmitting sounding reference signals (SRS) from more than 2 receive antennas.

23. An apparatus for wireless communications, comprising:
means for communicating on a serving cell carrier frequency with a user equipment (UE) that utilizes a first set of one or more receive antennas during a normal operational period;
means for receiving signaling from the UE to establish measurement gaps, wherein the signaling comprises signaling a capability to perform receive antenna diversity measurements during measurement gaps; and
means for configuring the UE with the measurement gaps for performing receive antenna diversity measurements on the serving cell carrier frequency with a second set of one or more receive antennas, wherein the second set of one more receive antennas does not include receive antennas in the first set of one or more receive antennas.

24. A non-transitory computer-readable medium having instructions stored thereon, the instructions being executable by one or more processors and the instructions comprising:
instructions for communicating with a serving base station on a serving cell carrier frequency using a first set of one or more receive antennas during a normal operational period;
instructions for performing receive antenna diversity measurements on the serving cell carrier frequency with a second set of one or more receive antennas during measurement gaps between normal operational periods, wherein the second set of one more receive antennas does not include receive antennas in the first set of one or more receive antennas, and wherein instructions for performing receive antenna diversity measurements comprises instructions for switching between taking measurements for the serving cell carrier frequency from the second set of antennas in one measurement gap and taking measurements for at least one of other carriers or other radio access technologies in a different measurement gap; and instructions for selecting one or more receive antennas for use, combining, or a combination thereof, based on the receive antenna diversity measurements.

25. The non-transitory computer-readable medium of claim 24, wherein the second set of antennas changes over time.

26. The non-transitory computer-readable medium of claim 24, wherein the instructions for performing the receive antenna diversity measurements comprises: choosing an automated gain control (AGC) operating point, performing a neighbor search to identify cells, or a combination thereof.

27. The non-transitory computer-readable medium of claim 26, wherein the neighbor search is at least one of skipped or limited to windows around a subset of cells found during intra-frequency search when measuring serving cell carrier frequency using other receive antennas in the measurement gaps.

28. The non-transitory computer-readable medium of claim 24, further comprising instructions for receiving control information, data, or a combination thereof from the serving base station on at least a subset of subframes in the measurement gaps.

29. The non-transitory computer-readable medium of claim 24, further comprising instructions for signaling the serving base station to establish the measurement gaps.

30. The non-transitory computer-readable medium of claim 29, wherein the instructions for signaling comprises requesting measurement gaps.

31. The non-transitory computer-readable medium of claim 29, wherein the instructions for signaling comprises signaling a capability to perform receive antenna diversity measurements during measurement gaps.

32. The non-transitory computer-readable medium of claim 24, wherein the instructions for performing receive antenna diversity measurements further comprises:

using samples from different sets of antennas in different measurement gaps while taking measurements for at least one of other carriers or other radio access technologies.

33. The non-transitory computer-readable medium of claim 24, further comprising:

instructions for transmitting sounding reference signals (SRS) from more than 2 receive antennas.

34. A non-transitory computer-readable medium having instructions stored thereon, the instructions being executable by one or more processors and the instructions comprising:

instructions for communicating on a serving cell carrier frequency with a user equipment (UE) that utilizes a first set of one or more receive antennas during a normal operational period;

instructions for receiving signaling from the UE to establish measurement gaps, wherein the signaling comprises signaling a capability to perform receive antenna diversity measurements during measurement gaps; and instructions for configuring the UE with the measurement gaps for performing receive antenna diversity measurements on the serving cell carrier frequency with a second set of one or more receive antennas, wherein the second set of one more receive antennas does not include receive antennas in the first set of one or more receive antennas.

35. The non-transitory computer-readable medium of claim 34, further comprising:

instructions for adjusting scheduling, based on the configured measurement gaps, of at least one of CQI report receptions, their use in rate control loops, or UL power control.

36. An apparatus for wireless communications, comprising:

a first set of one or more receive antennas;

a second set of one or more receive antennas, wherein the second set of one more receive antennas does not include receive antennas in the first set of one or more receive antennas;

a processor;

memory in communication with the processor, the memory including instructions that are executable by the processor to:

communicate with a serving base station on a serving cell carrier frequency using the first set of one or more receive antennas during a normal operational period;

perform receive antenna diversity measurements on the serving cell carrier frequency with the second set of one or more receive antennas during measurements gap between normal operational periods, wherein to perform receive antenna diversity measurements, the instructions are executable by the processor to switch between taking measurements for the serving cell carrier frequency from the second set of antennas in one measurement gap and take measurements for at least one of other carriers or other radio access technologies in a different measurement gap; and select one or more receive antennas for use, combining, or a combination thereof, based on the receive antenna diversity measurements.

37. The apparatus of claim 36, wherein the second set of antennas are configured to change over time.

38. The apparatus of claim 36, wherein to perform receive antenna diversity measurements, the instructions are executable by the processor to: choose an automated gain control (AGC) operating point, perform a neighbor search to identify cells, or execute a combination thereof.

39. The apparatus of claim 38, wherein to perform the neighbor search, the instructions are executable by the processor to at least one of skip or limit the neighbor search to windows around a subset of cells found during intra-frequency search when measuring serving cell carrier frequency using other receive antennas in the measurement gaps.

40. The apparatus of claim 36, wherein the instructions are executable by the processor to receive control information, data, or a combination thereof from the serving base station on at least a subset of subframes in the measurement gap.

41. The apparatus of claim 36, wherein the instructions are executable by the processor to signal the serving base station to establish the measurement gaps.

42. The apparatus of claim 41, wherein the instructions are executable by the processor to signal the serving base station to establish the measurement gaps by requesting measurement gaps.

43. The apparatus of claim 42, wherein the instructions are executable by the processor to signal the serving base station to establish the measurement gaps by signaling a capability to perform receive antenna diversity measurements during measurement gaps.

44. The apparatus of claim 36, wherein to perform receive antenna diversity measurements, the instructions are further executable by the processor to use samples from different sets of antennas in different measurement gaps while taking measurements for at least one of other carriers or other radio access technologies.

45. The apparatus of claim 36, wherein the instructions are executable by the processor to transmit sounding reference signals (SRS) from more than 2 receive antennas.

46. An apparatus for wireless communications, comprising:
  a processor;
  memory in communication with the processor, the memory including instructions that are executable by the processor to:
  communicate on a serving cell carrier frequency with a user equipment (UE) that utilizes a first set of one or more receive antennas during a normal operational period;
  receive signaling from the UE to establish measurement gaps, wherein the signaling comprises signaling a capability to perform receive antenna diversity measurements during measurement gaps; and
  configure the UE with the measurement gaps for performing receive antenna diversity measurements on the serving cell carrier frequency with a second set of one or more receive antennas, wherein the second set of one more receive antennas does not include receive antennas in the first set of one or more receive antennas.

47. The apparatus of claim 46, wherein the instructions are executable by the processor to adjust scheduling, based on the configured measurement gaps, of at least one of CQI report receptions, their use in rate control loops, or UL power control.

48. The method of claim 1, wherein the method is performed by a user equipment (UE), and wherein the UE comprises a baseband processor capable of supporting fewer antennas than a number of the first set of one or more receive antennas and the second set of one or more receive antennas.

* * * * *